June 4, 1968  A. MILLER  3,386,824
PHOTOGRAPHIC PROCESSING FILM LAMINATE STRUCTURE
UTILIZING PLASTIC MICROCAPSULES
Filed March 27, 1967  2 Sheets-Sheet 2

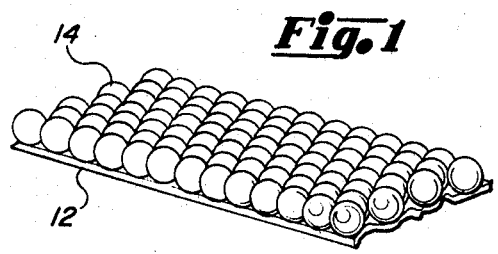
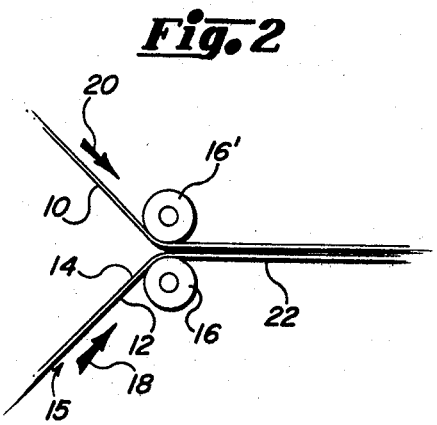
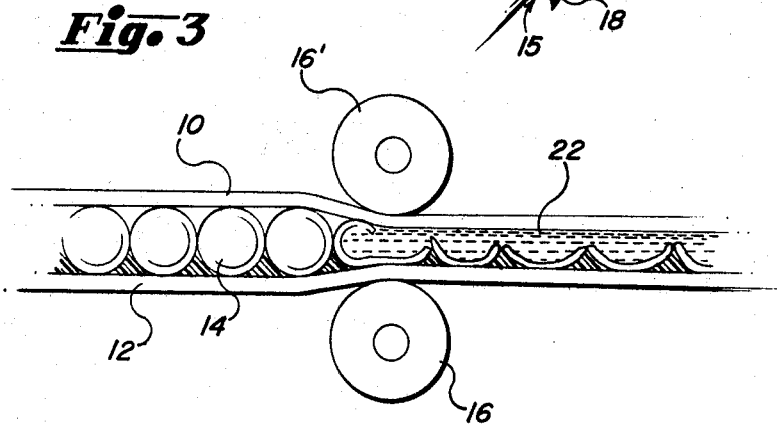
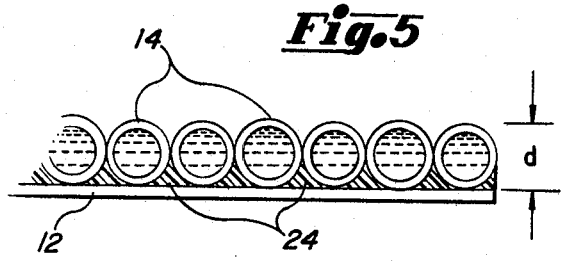

ALAN MILLER
INVENTOR.

BY
AGENT.

3,386,824
PHOTOGRAPHIC PROCESSING FILM LAMINATE STRUCTURE UTILIZING PLASTIC MICROCAPSULES
Alan Miller, Hallandale, Fla., assignor to Chicago Aerial Industries, Inc., Barrington, Ill., a corporation of Delaware
Continuation-in-part of application Ser. No. 335,232, Jan. 2, 1964. This application Mar. 27, 1967, Ser. No. 632,879
5 Claims. (Cl. 96—50)

ABSTRACT OF THE DISCLOSURE

A photographic contact processing carrier material having densely distributed layer of pressure, temperature or signed to the same assignee which application is now embedded in a nonporous support matrix.

CROSS REFERENCE TO RELATED APPLICATION

This is a continuation-in-part of application Ser. No. 335,232, filed Jan. 2, 1964, by the same inventor and assigned to the same assignee which application is now abandoned.

BACKGROUND OF INVENTION

This invention relates generally to means for processing photosensitive material and more particularly to a disposable sealed hydrophobic plastic carrier laminate containing photographic processing reactants capable of being released upon the application of localized pressure, heat or solvents.

The invention more particularly relates to a carrier support material having a surface or surfaces on which are adherent a profuse number of tiny of very small sized rupturable micro-capsules, each micro-capsule having a nucleus of photographic processing solutions. The local application of pressure, heat or solvent on the coated surface or surfaces of the carrier ruptures the micro-capsules in the locality in which the pressure is applied, releasing the liquid developer reactant nuclei so that the developer will coalesce upon contact with the emulsion surface of an exposed photographic material and effecutate its processing.

The foregoing described carrier laminate structure has particular application for the development of photographic film immediately after exposure in environments where the handling of liquid is not practical because of the danger of spillage. Such instances arise in both amateur, commercial and military photography where it is often desired to quickly view the results of an exposure so that another may be made if the first is defective. Whenever processing to accomplish this immediate viewing is to be performed outside of a darkroom, spillage of the very active developing chemical is usually highly objectionable. In fact, it is so objectionable and so difficult to accomplish that it is infrequently attempted other than with certain commerically available amateur type image transfer reversal materials yielding a positive image. Since these image-transfer reversal materials are not available in the complete range and variety that are conventional photographic films and yield positive rather than negative images, immediate viewing is not often attempted when negative images are desired.

Another example of a situation where processing immediately after exposure is often required and spillage is objectionable lies in the field of Military Aerial reconnaissance. In that field any spillage may result in damage to equipment remotely located with respect to an operator and hence difficult or impossible to repair. Further, spillage may interfere with the aircraft's electrical system and thus impose additional hazards.

In each of the foregoing described situations, it is desider to handle the photographic developer solutions in such a way that liquids cannot be spilled. Since encapsulation of the photographic developer reactant solutions prevent spillage prior to capsule rupture and since capsule rupture can be accomplished with the capsules in contact with the photographic material to be processed, it can be seen the encapsulation mitigates any spillage problem.

A normal requirement of photographic processing methods is that the developing recatant solutions be fresh and unoxidized at the time they are used. In many immediate viewing processing systems, the developing reactants are exposed to the atmosphere for a considerable length of time prior to their being brought into contact with the photographic material. Since the developing solutions oxidize quite readily, such a condition is not desirable and many quite extreme measures have been taken to reduce its occurrence. Since oxidation of the developing solutions before their employment in the developing process is prevented by encapsulating the developing solutions and maintaining them in that form until they are needed for the processing of photographic material, it can ture comprising a multitudinous number of micro-capsules the oxidation problem but inherently provides superior quality processing as well as an easily disposable residual package.

Therefore, it is a principal object of this invention to provide an encapsulated carrier laminate structure having a profuse number of very small or tiny size rupturable capsules each containing photographic processing materials and each forming a part of an overall lattice structure.

Another object of the invention is to provide an encapsulated photographic developer carrier laminate structure comprising a multitudinous number of micro-capsules each containing photographic processing reactants adaptable to be released at the point of contact with the emulsion of exposed photographic film to effectuate film processing.

Yet another object of this invention is to provide as a photographic processing material tiny micro-capsules responsive to external stimulus to release processing reactant solutions contained therein.

Still another object of this invention is to provide an encapsulated photographic developer carrier laminate structure comprising a web-like carrier material having dispersed thereon in profuse numbers a plurality of tiny oxidation inhibiting containers for photographic processing reactant solutions.

An important object of this invention is to provide an encapsulated photographc developer carrier in sheet form and comprising a matrix having embedded therein a profuse number of micro-capsules each containing photographic processing reactant solutions.

SUMMARY OF THE INVENTION

These objectives are achieved by the carrier laminate structure of the present invention, which comprises a multitude of micro-capsules in a single layer lattice arrangement supported by a matrix-like filler material upon a web-like carrier. The micro-capsules contain a photographic processing solution that is released and uniformly distributed over the photographic film emulsion surface when the capsules are ruptured by means of pressure, temperature or some similar external stimulus. Advantageously, the matrix material is nonporous to prevent undue leakage of the processing solution.

DESCRIPTION OF THE DRAWING

With the aforementioned and other incidental objects in view, the invention includes certain novel features, the essential elements of which are set forth in the appended claims and the preferred form or embodiment of which is hereinafter described in this specification in conjunction with the accompanying drawing in which;

FIGURE 1 is a greatly enlarged perspective view of a fragment of the encapsulated photographic developer carrier laminate structure of the invention;

FIGURE 2 illustrates the general manner of use of the encapsulated photographic developer carrier laminate structure of the invention;

FIGURE 3 is a cross sectional view showing in greatly enlarged and somewhat schematic form the action occurring when the micro-capsules of the encapsulated photographic developer carrier laminate structure of FIGURE 2 are ruptured;

FIGURE 5 is a cross section of FIGURE 1 showing in greatly enlarged form a feature of the photographic processing material.

DESCRIPTION OF THE INVENTION

Figure 4:
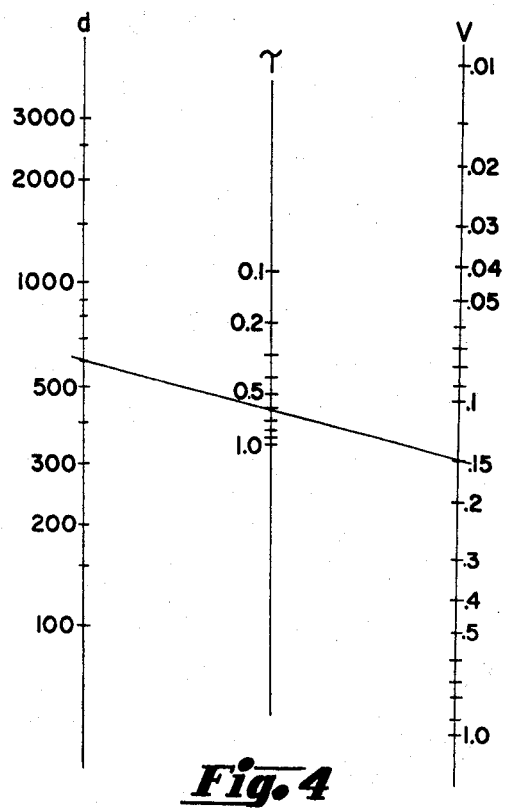
FIGURE 4 is a nomograph useful in determining the amount of photographic processing solutions contained in various size capsules.

Referring now to the drawing and particularly to FIGURE 1 thereof, an embodiment of the inventive encapsulated photographic developer carrier laminate is illustrated. As shown, the embodiment comprises a carrier 12 of web-like configuration supporting in matrix-like form a coating comprising a lattice arrangement of a profuse number of very small or tiny micro-capsules 14 each having a nucleus of photographic processing reactant solution. Both in the description preceding and following, reference is made to very small or tiny as a quantative measure of size in referring to the processing solution containing micro-capsules employed as a constituent part of the invention. Such references are intended to descriptively encompass a size range extending between approximately 100 and 3000 microns in diameter.

Figure 6:
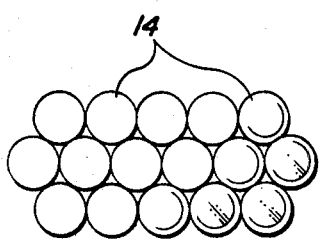
FIGURES 6 and 7 illustrate two different lattice-like arrangements of micro-capsules usefully employed in the encapsulated photographic developer carrier laminate structure of the invention.
Figure 7:
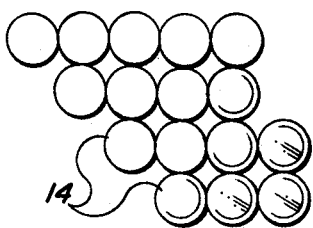

As shown in FIGURE 1, the micro-capsules are arranged in a single layer triangular lattice of the type illustrated in greater detail in FIGURE 6. The micro-capsules may equally as well be arranged in a single layer square lattice of the type illustrated in FIGURE 7 or any combination or permutation thereof including those with voids.

FIGURES 2 and 3 illustrate a typical manner of employing the inventive encapsulated photographic developer carrier laminate structure to effectuate the development of exposed photographic film. In FIGURE 2, the encapsulated photographic developer carrier laminate structure generally indicated at 15 is moving in the direction of arrow 18. Mating contact of the laminate structure 15 with the emulsion coated side of strip of exposed photographic film 10 moving in the direction of arrow 20 is achieved between pressure rollers 16 and 16'. With the coating of micro-capsules 14 between the carrier 12 and the film 10, the assemblage is passed between the pressure rollers and they, by exerting pressure on the support and photographic film, cause rupture of the micro-capsule walls. The ruptured micro-capsules release their nuclei of photographic processing liquid and the pressure causes the liquid to be spread uniformly over the exposed photographic material 10 in the vicinity of the pressure rollers. As is apparent, continued movement of the photographic film 10 and laminate structure 15 in the direction of the arrows 18 and 20 will continue the crushing of the micro-capsules and the releasing and spreading of their contents on the film. The area between the carrier 12 and photographic material 10 in which the capsules have been ruptured and their liquid nuclei released, is shown generally at 22.

Advantageously, although without intentionally limiting the practice of the invention to such materials, the photographic processing reactant solutions contained in the micro-capsules may be a monobath, that is, a single solution capable of both developing and fixing the exposed silver halides of the photographic material. Among the materials suitable for such monobath processing are those disclosed in U.S. Patent No. 3,252,797 issued to Dave R. Kazen and assigned to the same assignee as this invention. Other monobath processing solutions for use within the micro-capsules and possessing particular advantages when used to process the films indicated are the following:

PROCESSING SOLUTION "A"

(Suitable for X-ray film)

| | |
|---|---|
| Potassium sulfite | grams__ 35 |
| Isoascorbic acid | do____ 90 |
| Phenidone | do____ 2 |
| Thiovanic acid | cc__ 12 |
| Sodium hydroxide | grams__ 83 |
| Water to make 1 liter. | |

PROCESSING SOLUTION "B"

(Suitable for aerial photographic films)

| | Grams |
|---|---|
| Sodium sulfite | 35 |
| Hydroquinone | 29 |
| Phenidone | 2 |
| Potassium bromide | 0.4 |
| Sodium hydroxide | 20 |
| Sodium thiosulfate | 125 |
| Water to make 1 liter. | |

Because nicro-capsules provide a convenient means for segregating otherwise incompatible reactants, for certain applications of the invention the contents of the individual capsules coated on a figure carrier 12 may advantageously consist of different and incompatible reactants. Also, in order to effect sequential application of two or more reactants, advantage can be taken of the fact that the capsules may be manufactured with different rupture characteristics for different reactants. That is, groups of reactant containing capsules can be made each requiring different rupture temperature-pressure energy levels.

In photographic processing at least two applications arise where it is necessary to sequentially apply incompatible reactants. One such application occurs where it is desired to process photographic film in an extremely rapid manner. In such an instance it is desirable to utilize separate developers and fixatives to avoid the buffering necesary in monobath applications. In the processing of color film it is also necessary to sequentially apply incompatible reactants; namely, developers and bleaches. In both of these applications, by employing different rupture energy level characteristics for the capsules containing different reactants and by distributing the different capsules in a heterogeneous lattice arrangement on a carrier, an advantageous embodiment of the inventive encapsulated photographic processing carrier laminate structure is achieved; an embodiment where a desired sequential application of otherwise incompatible reactants is achieved by the sequential application of different rupture energy levels.

One method of forming the reactant solution containing micro-capsules used in the practice of the invention, is the method set forth in United States Patent No. 3,015,128 of G. R. Somerville, Jr. In forming capsules using the Somerville centrifugal encapsulating apparatus, the filler material or nucleus of the capsule to be formed, is trajected toward an encapsulating orifice carried by a rotating body. The orifice has a film of an encapsulating medium formed across it. This film separates from the orifice upon being struck by the nucleus material and surrounds the nucleus material. The freshly formed wet capsule is centrifugally cast outward from the rotating body into a hardening bath where the capsule shell is hardened. Capsule size and payload are dependent on a number of variables all of which are discussed in detail in the Somerville patent. Among the variables however, are those associated with the capsule shell or encapsulating medium itself and this material must be chosen with regard to the nucleus of photographic developing reactant solutions utilized in the practice of the invention. Among the encapsulating materials that have proven compatible with the monobaths described and which have demonstrated an ability to withstand storage and use environmental temperatures in the 45° F. to 130° F. range usually associated with photographic processing materials are chlorinated rubber, polyvinyl chloride, vinyl chloride copolymers, rubber hydrochloride, olefin copolymers, low molecular weight polyethylenes, "Elvax" polyethylene vinyl acetate copolymers with various resins hardeners, and various paraffines and waxes.

In manufacturing micro-capsules having monobath processing solution "A" as a nucleus material and having an "Elvax"-acrylic resin composition as an encapsulating wall material, micro-capsules have been prepared varying in size between 200 and 3000 microns in diameter and which contain filler payloads varying between 50% by volume and 85% by volume of the individual capsules volume. Generally, it has been found that as the capsule size is decreased, the relative percentage of usable filler payload possible to attain for each capsule, is also reduced. That is, there is a certain minimum thickness of wall for each capsule material which cannot be reduced and which becomes an increasing percentage of the total capsule diameter as capsule size is decreased. Naturally, as wall thickness increases, so also does resistance to accidental rupture of the individual capsules. However, for most applications accidental rupture has not proven to be a significant problem.

The most difficult problem encountered in preparing the encapsulated photographic developer carrier laminate of the invention has been insuring the release of sufficient developer reactant liquids to effectuate the complete development of the photographic material while simultaneously maintaining minimum thickness in the coating 14. These requirements tend to be conflicting and no general solution to the required compromise has been perfected. Usually, the problem is solved by determining the minimum processing reactant solution requirements of the photographic material and then using as small a size micro-capsule as will permit release of this minimum amount of solution. For example, it has been generally found that about 0.1 cc. of active processing reactant solution must be released for each square inch of aerial photographic film to be developed. The inventor has achieved this amount of payload in one advantageous embodiment of this invention utilizing 500 micron diameter micro-capsules deposited on a polyester film carrier in a monostratic lattice approximating that illustrated in FIGURE 6. In this embodiment each of the 500 micron capsules contained approximately in 85% payload of developing reactant solution.

FIGURE 4 is a nomograph useful in determining solution availability in a single stratum of micro-capsules arranged in the triangular lattice form of FIGURE 6. The nomograph is of a standard type where a straight line passing through known points on any 2 scales reveals the value of an unknown on the 3rd scale. To simplify preparation of the nomograph, it was prepared utilizing as a formula one that yields a close approximation to the fluid volume of a unit area covered with a single stratum of micro-capsules but, always slightly overstates the available volume. The nomograph formula is:

$$V = 3.9 \times 10^{-4} rd$$

The three unknowns of the formula and the 3 scales of the FIGURE 4 nomograph are labeled "$d$, $r$ and $V$" and correspond respectively to capsule diameter in microns, percentage of capsule volume occupied by filler developer solution, and total volume of encapsulated liquid in cubic centimeters per square inch. In the example indicated in the drawing, a single stratum of 600 micron capsules having 60% of their volume occupied by developer solutions and arrayed with maximum spatial efficiency in a triangular lattice, is indicated as containing 0.15 cc. of developer reactant solution per square inch.

As partially revealed by the nomograph and because it is possible to attain higher percentages of useful payload due to the relatively thinner capsule walls attainable in larger size capsules, it has been found advantageous to utilize the larger sized micro-capsules where it is necessary or desirable to release large quantities of processing solution. Micro-capsules have been effectively produced having diameters up to approximately 3000 microns and containing payloads on the order of 80 to 85% of their enclosed volume. However, depending upon the particular shell material used, such capsules tend to be too fragile for most applications and generally smaller size capsules in the range of 300 to 1500 microns in diameter are preferred.

After preparation of the developer reactant containing micro-capsules 14, they are applied to a carrier material 12. This application of the micro-capsules may be performed following any conventional coating process that does not involve high pressure since high pressure might rupture the capsules.

One method of capsule distribution that has been successfully employed includes applying the capsules from a hopper extending transversely above a moving carrier which then passes beneath a doctor blade. The doctor blade may be set at a small angle with respect to the direction of carrier travel to improve the capsule packing density. The size of the angle may be varied according to the size and fragility of the capsules in order to avoid rupturing the capsules. Additionally, moving the carrier at a small angle of declination while simultaneously vibrating it transversely in the area of the doctor blade will aid in causing the capsules to assume a maximum density upon the carrier, thus approximating the triangular lattice of FIGURE 6. Advantageously, side guides may be used to prevent the capsules from being vibrated off of the carrier. However, since it forms no part of the invention, the method of distributing the capsules onto the carrier is not further discussed herein.

Carrier materials which may advantageously be used in the practice of the invention comprise polyvinyl chloride sheet, vinyl chloride acetate, grain oriented polyester sheet, waxed paper, etc. Generally, any relatively high tensile strength hydrophobic material can be employed. The hydrophobic characteristic is required in order to prevent absorption or adsorption of the developer reactant solutions after their release by the rupture of the micro-capsules. Preferably of course, the carrier material must be resistant to attack from the processing solution contained in the micro-capsules.

The micro-capsules are attached to the carrier by any suitable adhesive. For most plastic carrier materials small amounts of organic solvents that lightly attack both the micro-capsule shell and the carrier material will suffice. In practice the solvents can be applied to the carrier material immediately before the application of the micro-capsules. The solvent softens the plastic carrier leaving a small solvent residue which in turn slightly softens the capsules' exterior when they are applied so that capsule and carrier are caused to adhere to each other. When employing thermoplastic materials for both the capsules and the carrier, it has been found possible to soften both the carrier and the capsules sufficiently to obtain mutual adherence by effecting the application of localized heat at or slightly before the point of contact of the capsules with the carrier. Naturally, such heat must be carefully controlled so that the capsules are not ruptured by its presence.

Still another method of capsule coating the carrier material which appears to have merit and which has been experimentally verified, involves the deposition of the fresh formed capsules on the carrier before the capsule shell has completely hardened after its formation. However, this method does require quite precise control of the capsule formation process.

The presently preferred form of the inventive encapsulated photographic developer carrier laminate is achieved with the structure illustrated in FIGURE 5. As there shown, if the profuse number of micro-capsules 14 are arranged on the carrier 12 to achieve the greatest packing density, i.e., that achieved with the triangular lattice arrangement of FIGURE 6, interstitial voids between the capsules represent approximately 40% (39.4) of the total volume of a stratum of depth $d$. It is an advantageous feature of the invention that the inventor has discovered that capsule rupture characteristics are improved and that total solution availability is materially enhanced when a substantial part of the interstitial void area is filled as indicated at 24. Generally, the filler-matrix 24 is a non-porous plastic and most frequently of identical composition with the capsule shell, thereby being likewise impervious to the solution contained therein.

The filler-matrix 24 performs at least three advantageous functions; namely, forming a binding matrix adhering the capsules to the carrier, localizing stress at the time of rupture in the capsule half that is away from the carrier, and increasing total solution availability by preventing reactant solution from filling part of the interstitial voids. All three of these advantages are achieved when a preselected volume of filler-matrix material 24 is metered onto the carrier before the micro-capsules are applied. Ideally this amount is ½ the volume of the interstitial volume of a micro-capsule stratum or for the stratum arrangement of FIGURE 6, 20% of total stratum volume. Actually more filler is generally required since the micro-capsules tend to form a lattice that is a composite of those shown in FIGURES 6 and 7 with additional voids. While the triangular lattice arrangement of FIGURE 6 is preferred and its possibility of achievement enhanced by maintaining the viscosity of the filler-matrix material 24 as low as possible, it has not proven possible to actually achieve such an arrangement in practice. As a result it has been found that the filler-binder matrix material quantity must be varied between 25 and 42% of stratum volume, the higher percentages being required with higher viscosity matrix materials to fill the resulting higher number of voids.

One method of achieving low viscosity of the matrix layer 24 during application of the micro-capsules 14 to the carrier 12 is by using low viscosity low molecular weigh vinyl chloride monomers either alone or as organisols. The monomers and capsules are first premixed in a carefully proportioned ratio and then applied to the carrier. After application to the carrier, mass polymerization of the monomers to form a polyvinyl chloride matrix can be initiated using various types of radiation such as those obtained form an ultraviolet or Cobalt 60 (gamma ray) source. As in the conventional preparation of polyvinyl chloride, polymerization is markedly accelerated by the addition of catalysts such as benzoyl peroxide.

In maintaining the low viscosity characteristics desired of the matrix material at the time of capsule application to the carrier, considerable success has been achieved by using a low viscosity highly active and volatile solvent for the carrier 12 to form the matrix. When this method is followed, the resulting softened carrier permits the capsules to partially embed themselves therein and after volatilization of the solvent the carrier also forms the matrix. When this method is carefully controlled, the need for filler-matrix material can be completely fulfilled by the material of the carrier.

Quite promising results have been achieved using a sheet-like structure comprised of filled micro-capsules suspended in a resinous matrix to effect their mutual adherence without benefit of a carrier material. Since thickness of the overall material of the invention is often critical, these carrier-less materials substantially mitigate the thickness problem. The carrier-less encapsulated developer structures are ordinarily prepared by application of a matrix material-capsule mixture to a release surface such as a silicone resin. After hardening of the filler-matrix surrounding the micro-capsules, the matrix containing the reactant filled micro-capsules may be stripped from the release surface to form a carrier-less encapsulated developer reactant structure. As in other embodiments, the requirement continues that the surface away from the photographic film at the time the developer is released must be water impervious. As a result, for carrier-less structures the additional requirement of being hydrophobic is placed on the filler-binder matrix.

Most systems involving moving belts or belt-like elements are subject to the accumulation of a static charge on the belts. In photographic systems such a charge accumulation is highly objectionable since any release of the charge effects an exposure of the film. It is a feature of the invention that the encapsulated developer carrier laminate can be processed to substantially mitigate the static charge problem without interfering with the developing action. It has been found that thermoplastic hydrophobic plastic film carriers such as a vinyl chloride acetate resin base or a polyvinyl chloride resin base may be processed to substantially reduce the electric static charges by coating the surface of the carrier with a non-ionic surface active material such as the polyalkylene glycol compositions. By applying such a coating, problems with static electrical discharges have been reduced.

In the foregoing description reference has been made to the use of pressure and temperature to effectuate the rupture of the micro-capsules. Equally advantageous in certain applications are other capsule rupturing methods. These other rupturing methods have included both additively and alternately to pressure application, the employment of heat and ultrasonic vibrations. The most frequently used rupturing method has employed a simple pair of rollers as schematically illustrated in FIGURES 2 and 3. In some embodiments, as noted in the foregoing, supplementing the application of pressure with carefully, controlled heat can prove advantageous. However, since the particular manner of achieving the capsule rupture necessary to use the inventive material, is not a part of the invention, it will not be discussed further.

From the foregoing it can be seen that this invention is one well adapted to attain all the ends and objects hereinabove set forth together with other advantages which are obvious and which are inherent in the material of the invention.

As many possible embodiments may be made of the invention without departing from the scope thereof, it is to be understood that all matter herein set forth or shown in the accompanying drawing is to be interpreted as illustrative and not in a limiting sense. It will be further understood that certain features and subcombinations are of utility and may be employed without reference to other features and subcombinations. This is contemplated by and is within the scope of the claims.

The invention having been described, what is claimed is:

1. A silver halide photographic emulsion processing carrier laminate structure comprising:
   a thermoplastic hydrophobic film carrier;
   frangible, hollow plastic micro-capsules containing silver halide photographic processing reactants distributed in a single layer lattice arrangement over a surface of said film carrier, said micro-capsules being of a size within the range from 200 to 3000 microns in diameter; and a nonporous filler-matrix plastic material binding the micro-capsules in said lattice arrangement and sealing the lower portion thereof, said micro-capsules in said matrix possessing rupture characteristics that cause uniform dispersion of said reactants when rupture occurs with said micro-capsules contacting an exposed photographic film emulsion.

2. A silver halide photographic emulsion processing carrier laminate structure comprising:

a thermoplastic hydrophobic film carrier;

frangible, hollow plastic micro-capsules containing silver halide photographic processing reactants distributed in a single layer lattice arrangement over a surface of said film carrier, said micro-capsules being of substantially uniform size within the range from 300 to 1500 microns in diameter, said capsules being distributed to make said single layer lattice arrangement into an essentially triangular formation; and a nonporous filler-matrix plastic material binding the micro-capsules in said lattice arrangement and sealing the lower portion thereof, said micro-capsules in said matrix possessing rupture characteristics that cause uniform dispersion of said reactants when rupture occurs with said micro-capsules contacting an exposed photographic film emulsion.

3. A photographic emulsion processing carrier laminate structure as set forth in claim 2 wherein said filler-matrix material fills the voids between the surfaces of said micro-capsules that face said carrier, whereby thin-walled capsules of large reactant holding capacity are provided which will rupture on the unsupported portions thereof upon application of pressure thereto.

4. A photographic emulsion processing carrier laminate structure as set forth in claim 2 wherein said filler-matrix occupies between 25% and 42% of the volume between said carrier and a plane passing along the top surfaces of said capsule layer.

5. A photographic emulsion processing carrier laminate structure as set forth in claim 2 wherein the total volume of said processing reactants in said capsule expressed in cubic centimeters per square inch of said carrier surface is equal to 3.9 times $10^{-4}$ multiplied by the capsule diameter in microns and the fraction of capsule volume occupied by said reactants.

References Cited
UNITED STATES PATENTS

| | | | |
|---|---|---|---|
| 3,016,308 | 1/1962 | Macaulay | 117—100 |
| 3,138,515 | 6/1964 | Dritz | 117—36.1 |
| 3,165,406 | 1/1965 | Murray | 96—76 |
| 3,306,747 | 2/1967 | Haas | 96—29 |

NORMAN G. TORCHIN, *Primary Examiner.*

C. E. DAVIS, *Assistant Examiner.*

UNITED STATES PATENT OFFICE
CERTIFICATE OF CORRECTION

Patent No. 3,386,824                                   June 4, 1968

Alan Miller

It is certified that error appears in the above identified patent and that said Letters Patent are hereby corrected as shown below:

Column 1, line 17, "signed to the same assignee which application is now" should read -- solvent rupturable reactant-containing micro-capsules half --. Column 2, line 5, "sider" should read -- sired --; line 26, "ture comprising a multitudinous number of micro-capsules" should read -- be seen that encapsulation not only offers a solution to --.

Signed and sealed this 20th day of January 1970.

(SEAL)
Attest:

Edward M. Fletcher, Jr.                          WILLIAM E. SCHUYLER, JR.
Attesting Officer                                        Commissioner of Patents